UNITED STATES PATENT OFFICE.

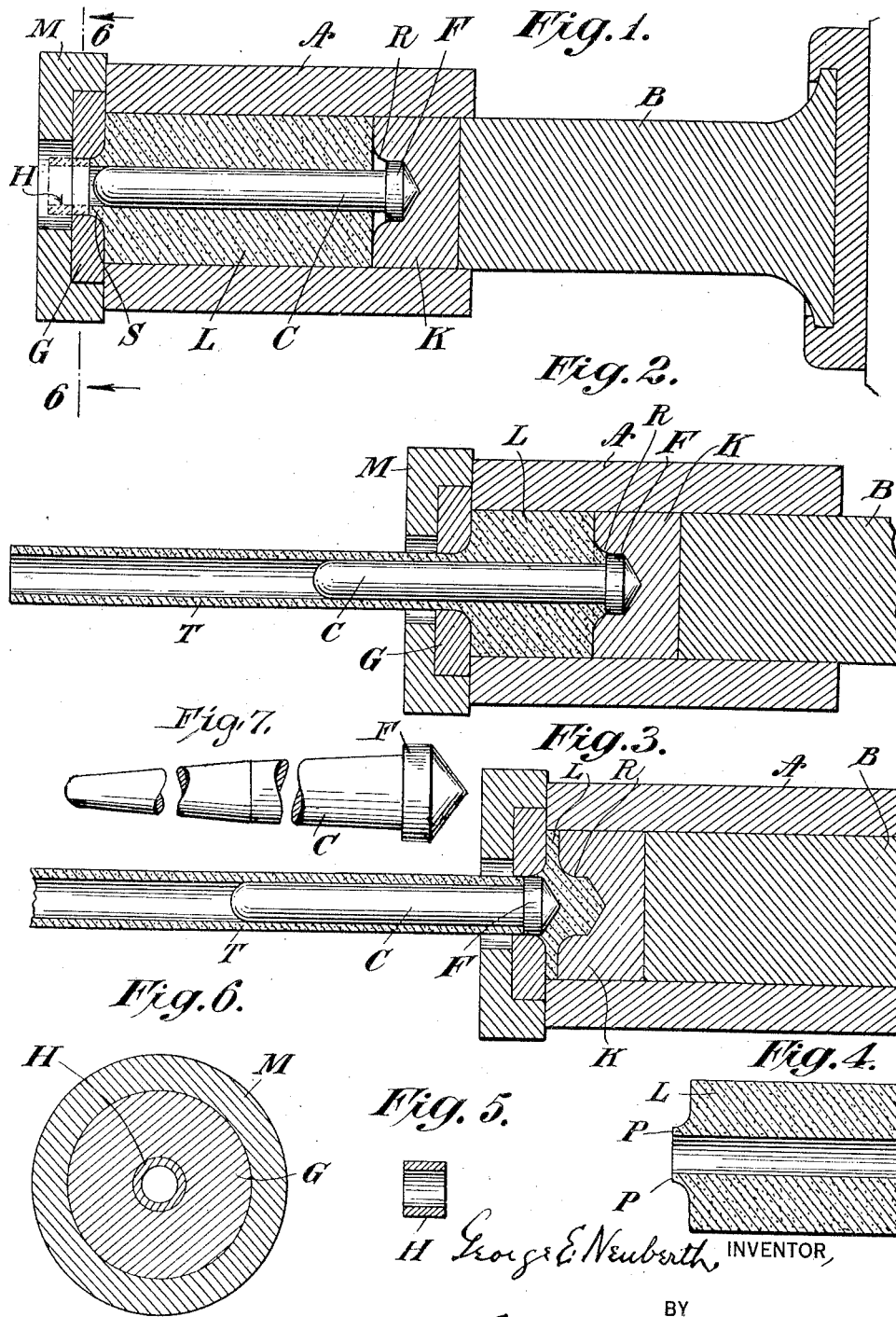

GEORGE E. NEUBERTH, OF NEWARK, NEW JERSEY, ASSIGNOR TO NEUBERTH PRODUCTS CORPORATION, OF NEW YORK, N. Y., A CORPORATION OF NEW YORK.

MACHINE FOR MAKING SEAMLESS TUBING OF METAL, PULP, OR OTHER MATERIALS.

1,330,489. Specification of Letters Patent. Patented Feb. 10, 1920.

Application filed March 7, 1919. Serial No. 281,200.

*To all whom it may concern:*

Be it known that I, GEORGE E. NEUBERTH, a citizen of the United States, residing at and whose post-office address is No. 834 South Thirteenth street, in the city of Newark, county of Essex, and State of New Jersey, have invented a new and useful Machine for Making Seamless Tubing of Metal, Pulp, or other Materials, of which the following is a specification.

My invention relates to improvements in machines for making seamless tubing, and is an improvement upon my invention patented November 19, 1918, Patent No. 1,285,328.

I attain the objects of my invention by mechanism illustrated in the accompanying drawing, in which—

Figure 1 is a vertical section of the machine; Fig. 2 is a vertical section of the machine showing the position of the parts after the operation has started but not finished; Fig. 3 is a vertical section of the machine showing the position of the parts of the mechanism at the conclusion of the extruding of tubing; Fig. 4 is a portion of the hollow billet showing a preferred form of the hollow billet used for making the tubing; Fig. 5 is a ring or ferrule, preferably of metal, used when plastic or ground material is made into tubing; Fig. 6 a cross sectional view of the machine through cross section 6—6 of Fig. 1. Fig. 7 shows, in large scale, the arbor, C, broken in two places along its length, to illustrate the varying degrees of its taper.

Similar letters refer to similar parts throughout the several views.

As shown in the drawing, the cylinder, A, is mounted on a hydraulic press whose ram or plunger, B, has an outer diameter of the same size as the interior diameter of the cylinder, A. The cylinder, A, has a diameter of a size to receive a hollow billet of the metal or material to be made into tubing. At the end of the cylinder, A, opposite to the ram, B, is secured the die, G, which has an opening through which the tubing is extruded. I provide a re-usable cylindrical arbor or core, C, of hard, heat-resisting steel, or other suitable hard, heat-resisting material, of such diameter as may be desired for the interior diameter of the tubing to be extruded, which arbor is provided at the ram end with an enlargement, or head, F, of a diameter equal to the diameter of the opening in the die, G. By slightly tapering the arbor, C, (the taper of the arbor being exaggerated in the drawing) from its head toward its other end, and by slightly varying this tapering of the arbor, C, at different parts of its length, for example, by giving the arbor, C, three slightly different degrees of tapering, the amount of the billet extruded in tubing is greatly increased, the strain on the arbor is diminished and the danger of injuring the arbor practically eliminated. A good efficiency of the machine is obtained if the arbor, C, is divided, in its length, into approximately three equal parts and the tapering of these three parts is slightly varied. To attain these results it is only necessary to give the arbor or mandrel a slight taper, as, for example, one-quarter of an inch between its tip end and its head, although the objects of my invention may be attained by a greater or even less degree of taper. The arbor, in all cases, is smallest at its tip end, gradually increasing in diameter toward its head.

In front of the ram, B, I provide a dummy block, or ring, K, of hard, heat-resisting steel, or other suitable hard, heat-resisting material, which dummy block on its side opposite the ram preferably has a recess or other convenient means of a size to receive and center the end of the head, F, of the arbor, C, as shown in Fig. 1. This dummy block, K, may be secured to the ram, B, or may be an integral part thereof, or may be a separate ring. The cylinder head, M, which holds the die, G, is removably secured to the cylinder, A, in the ordinary manner. I provide a recess, R, (Fig. 3) in the dummy block, K, preferably provided with a flaring mouth, as shown in the drawing, and this recess is sufficiently deep to admit the entire head, F, of the arbor, C, within it, so that the head, F, is inserted entirely within the recess of the dummy block for a distance of approximately one-quarter of an inch (or more) beyond the outer face of the dummy block, as shown in Figs. 1 and 2. With this construction, the metal of the billet, L, at the beginning of the extruding operation, is pressed into the recess in the dummy block around the arbor just below its head. The arbor and the dummy block being cold, the hot metal of the billet which comes into immediate contact with the face of the dummy block and the arbor head is chilled and slightly hardened, forming a thin mushroom shaped mass around the arbor just below its head and extending along the outer surface of the dummy block, K. This mushroom shaped chilled and slightly hardened mass around the arbor and just below its head serves to impede the outward movement of the arbor, C, through the opening in the die, G, thereby substantially increasing the amount of the billet extruded in tubing, for as soon as the arbor passes into the die, G, no more of the billet is extruded in tubing, and the slower the movement of the arbor, C, from its position shown in Fig. 1 to its position shown in Fig. 3, the greater is the amount of the billet extruded in tubing.

The method of operation of my device is: The plunger of the press is drawn back out of the cylinder, A, to admit of the insertion in the cylinder, A, of a hollow billet, L, which, in the case of metal, is heated as hot as possible and still retain its shape. The billet, L, is inserted in the cylinder, A, with the arbor, C, in the hollow of the billet. The dummy block, K, is placed against the billet with the end or head, F, of the arbor, C, centered in the cylinder, A, by having its end or head, F, inclosed in the recess provided in the dummy block, K, and the plunger, B, is brought forward against the rear of the dummy block, as shown in Fig. 1. Pressure is then applied to the plunger, B, thereby forcing the material of the billet, L, and also the arbor, C, out through the circular opening in the die, G, the metal being thereby extruded in a continuous seamless tube. Fig. 1 shows the parts of the mechanism with the billet in place at the beginning of the operation; Fig. 2 shows the position of the parts of the mechanism at a point in the operation when a portion of the billet has been extruded in the form of tubing; and Fig. 3 shows the position of the parts of the mechanism at the conclusion of the extruding of tubing from the cylinder, A. The motion of the metal of the billet, in the extruding process, separates the arbor, C, from the dummy block, K, until, at the conclusion of the extruding of tubing, the parts are in the approximately relative position shown in Fig. 3. As the head of the arbor, C, passes through the opening in the die, G, it cuts the extruding metal, thereby forming the end of the tube. The arbor, C, is then removed from the tubing by a blow on its front end, the tapering of the arbor, C, facilitating its removal from the tubing. The cylinder-head, M, is then removed, and, by means of the ram, the dummy block, K, and the portion of the billet still remaining in the cylinder are forced from the cylinder, A. The ram is then withdrawn, the ports replaced and the operation repeated.

Tubing may be extruded by the mechanism and process here described, without extruding the arbor entirely from the cylinder, A, but the construction shown in the drawing is one of the preferred forms of my invention.

I have found in practice that the operation is facilitated by providing a form of hollow billet which can be centered in the cylinder, A, at the beginning of the operation, one of the preferred forms of which is shown in Fig. 4. The circular projection, P, drops into the recess, S, and facilitates the centering of the billet and arbor, C, in the cylinder, A, at the beginning of the operation, which assures a tubing of uniform thickness.

The recess in the dummy block, K, (or in the outer side of the head of the ram) for the head, F, of the arbor, C, secures a positive centering of the rear end of the arbor, C.

The form of the mechanism, which I have shown and described, is only one form in which my invention may be embodied; it is obvious that other forms may be used without departing from my invention.

It is obvious that with certain metals it is not necessary to heat them, as they may be extruded cold. It is also obvious that with certain materials, paper pulp for example, it is not necessary that they be first made into billets but that they may be placed in the cylinder in a plastic or ground condition, either alone or mixed with proper binding material, and then extruded. With materials of the latter character, it is preferable, at the outset of the operation, to secure the arbor, C, in the center of the die, G, by inserting a ring or ferrule, H, Fig. 5, in the die-opening in the die, G, before the material is placed in the cylinder. When the ferrule, H, is used, it incloses the lower end of the arbor, C, thereby holding it centered in the die-opening, G, at the beginning of the operation. When pressure is applied, the material in the cylinder, A, and the arbor, C, forces out the ferrule, H, leaving the arbor, C, centered in the opening of the die, G, thereby assuring tubing of uniform thickness.

I claim:

1. In a machine for making seamless tubing in which the inner surface of the tubing is defined by an arbor which is disconnected from, but whose cylindrical head fits into and is moved by, a ram, and in which the outer surface of the tubing is defined by a circular opening in a die placed at the closed end of the cylinder of such ram, and a ram head, operating in said cylinder and provided with a recess to receive such arbor head, which recess is deeper than the length of said arbor head.

2. In a machine for making seamless tubing in which the inner surface of the tubing is defined by an arbor which is disconnected from, but whose cylindrical head fits into and is moved by, a ram, and in which the outer surface of the tubing is defined by a circular opening in a die placed at the closed end of the cylinder of such ram, a ram head operating in said cylinder and provided with a recess to receive such arbor head, which recess is deeper than the length of said arbor head, and an arbor which is tapered from its head toward its other end in varying degrees of taper.

3. In a machine for making seamless tubinb in which the inner surface of the tubing is defined by an arbor which is disconnected from, but whose cylindrical head fits into and is moved by, a ram, and in which the outer surface of the tubing is defined by a circular opening in a die placed at the closed end of the cylinder of such ram, a ram head operating in said cylinder and provided with a recess to receive such arbor head, which recess is deeper than the length of said arbor head, an arbor which is tapered from its head toward its other end in varying degrees of taper, and means for centering said arbor and a hollow billet in the cylinder of said ram.

4. In a machine for making seamless tubing in which the inner surface of the tubing is defined by an armor which is disconnected from but whose cylindrical head fits into and is moved by, a ram, and in which the outer surface of the tubing is defined by a circular opening in a die placed at the closed end of the cylinder of such ram, and a ram head operating in said cylinder and provided with a recess to receive such arbor head, which recess is deeper than the length of said arbor head, said recess having a mouth at its front end of a size and shape to allow the metal of the billet to be forced into the recess around the arbor and in front of its head.

5. In a machine for making seamless tubing in which the inner surface of the tubing is defined by an arbor which is disconnected from, but whose cylindrical head fits into and is moved by, a ram, and in which the outer surface of the tubing is defined by a circular opening in a die placed at the closed end of the cylinder of such ram, a ram head operating in said cylinder and provided with a recess to receive such arbor head, which recess is deeper than the length of said arbor head, said recess having a mouth at its front end of a size and shape to allow the metal of the billet to be forced into the recess around the arbor and in front of its head, and means for centering said arbor and a hollow billet in the cylinder of said ram.

6. In a machine for making seamless tubing in which the inner surface of the tubing is defined by an arbor which is disconnected from, but whose cylindrical head fits into and is moved by a ram, and in which the outer surface of the tubing is defined by a circular opening in a die placed at the closed end of the cylinder of such ram, a ram head operating in said cylinder and provided with a recess to receive such arbor head, which recess is deeper than the length of said arbor head, said recess having a mouth at its front end of a size and shape to allow the metal of the billet to be forced into the recess around the arbor and in front of its head, and means for centering said arbor and the hole in said hollow billet to the opening in said die.

7. In a machine for making seamless tubing in which the inner surface of the tubing is defined by an arbor which is disconnected from, but whose cylindrical head fits into and is moved by, a ram, and in which the outer surface of the tubing is defined by a circular opening in a die placed at the closed end of the cylinder of such ram, and a ram head, slightly smaller than the internal diameter of said cylinder, operating in said cylinder and provided with a recess to receive such arbor head, which recess is deeper than the length of said arbor head.

8. In a machine for making seamless tubing in which the inner surface of the tubing is defined by an arbor which is disconnected from, but whose cylindrical head fits into and is moved by, a ram, and in which the outer surface of the tubing is defined by a circular opening in a die placed at the closed end of the cylinder of such ram, a ram head, slightly smaller than the internal diameter of said cylinder, operating in said cylinder and provided with a recess to receive such arbor head, which recess is deeper than the length of said arbor head, said recess having a mouth at its front end of a size and shape to allow the metal of the billet to be forced into the recess around the arbor and in front of its head, and means for centering said arbor and the hole in said hollow billet to the opening in said die.

GEORGE E. NEUBERTH.

Witnesses:
F. A. SPAETH,
JOHN P. MARSBEY.